United States Patent
Han et al.

(10) Patent No.: US 10,284,406 B2
(45) Date of Patent: May 7, 2019

(54) METHOD AND APPARATUS FOR GENERATING CODE SEQUENCE IN A COMMUNICATION SYSTEM

(71) Applicant: LG ELECTRONICS INC., Seoul (KR)

(72) Inventors: Seung Hee Han, Seoul (KR); Min Seok Noh, Seoul (KR); Yeong Hyeon Kwon, Suwon-si (KR)

(73) Assignee: LG ELECTRONICS INC., Seoul (KR)

( * ) Notice: Subject to any disclaimer, the term of this patent is extended or adjusted under 35 U.S.C. 154(b) by 727 days.

(21) Appl. No.: 14/511,896

(22) Filed: Oct. 10, 2014

(65) Prior Publication Data

US 2015/0029997 A1    Jan. 29, 2015

Related U.S. Application Data

(63) Continuation of application No. 12/298,488, filed as application No. PCT/KR2007/002117 on Apr. 30, 2007, now Pat. No. 8,873,649.

(30) Foreign Application Priority Data

| May 1, 2006 | (KR) | 10-2006-0039338 |
| Aug. 11, 2006 | (KR) | 10-2006-0076146 |
| Aug. 14, 2006 | (KR) | 10-2006-0076813 |

(51) Int. Cl.
| H04L 27/26 | (2006.01) |
| H04J 13/00 | (2011.01) |
| H04J 13/10 | (2011.01) |
| H04L 7/00 | (2006.01) |
| H04L 23/02 | (2006.01) |
| H04W 72/04 | (2009.01) |

(52) U.S. Cl.
CPC ...... *H04L 27/2626* (2013.01); *H04J 13/0059* (2013.01); *H04J 13/107* (2013.01); *H04L 7/0091* (2013.01); *H04L 23/02* (2013.01); *H04L 27/2605* (2013.01); *H04W 72/0453* (2013.01)

(58) Field of Classification Search
CPC .......................... H04W 36/04; H04L 27/2628
See application file for complete search history.

(56) References Cited

U.S. PATENT DOCUMENTS

| 4,493,080 A | 1/1985 | Campbell |
| 6,724,838 B2 | 4/2004 | Wei-Ku et al. |
| 6,891,815 B1 * | 5/2005 | Song ..................... H04B 1/707 370/335 |

(Continued)

FOREIGN PATENT DOCUMENTS

| GB | 2 350 037 A | 11/2000 |
| WO | WO 2006/015108 A2 | 2/2006 |

*Primary Examiner* — Andrew W Chriss
*Assistant Examiner* — Kenan Cehic
(74) *Attorney, Agent, or Firm* — Birch, Stewart, Kolasch & Birch, LLP

(57) ABSTRACT

A method for transmitting a signal by a transmitting side device, the method including combining a first sequence and a second sequence to generate a third sequence in a frequency domain. The second sequence is obtained by cyclic shifting the first sequence. The method further includes transforming the third sequence into a time domain signal; and transmitting the time domain signal to a receiving side device. The third sequence includes information to identify a cell and is periodically transmitted.

2 Claims, 11 Drawing Sheets

(56) References Cited

U.S. PATENT DOCUMENTS

| | | |
|---|---|---|
| 7,646,283 B2 | 1/2010 | Wilcox |
| 7,808,886 B2 | 10/2010 | McCoy |
| 2001/0025361 A1 | 9/2001 | Kim |
| 2003/0231714 A1* | 12/2003 | Kjeldsen .................. H04B 1/69 375/259 |
| 2004/0022183 A1* | 2/2004 | Li ........................ H04L 1/0618 370/210 |
| 2004/0085946 A1 | 5/2004 | Morita et al. |
| 2004/0109405 A1* | 6/2004 | Suh .................... H04L 27/2613 370/208 |
| 2004/0160934 A1 | 8/2004 | Back |
| 2004/0170157 A1 | 9/2004 | Kim et al. |
| 2006/0018411 A1* | 1/2006 | Gore .................. H04L 25/0204 375/340 |
| 2006/0050799 A1* | 3/2006 | Hou .................... H04J 13/0062 375/260 |
| 2006/0221810 A1* | 10/2006 | Vrcelj ................. H04L 27/2656 370/208 |
| 2007/0047666 A1* | 3/2007 | Trachewsky .......... H04L 1/0006 375/267 |
| 2007/0140106 A1* | 6/2007 | Tsai ..................... H04B 7/2681 370/208 |
| 2007/0253465 A1 | 11/2007 | Muharemovic et al. |
| 2008/0273582 A1 | 11/2008 | Gaal et al. |
| 2008/0291945 A1 | 11/2008 | Luo |
| 2009/0252092 A1 | 10/2009 | Yoshii |
| 2010/0091907 A1 | 4/2010 | Noh et al. |
| 2010/0329189 A1 | 12/2010 | Tsuboi et al. |
| 2012/0039258 A1* | 2/2012 | Nakao ................. H04J 13/0003 370/328 |
| 2013/0219180 A1 | 8/2013 | Saino et al. |
| 2013/0315173 A1* | 11/2013 | Nakao .................. H04B 1/7075 370/329 |
| 2016/0270066 A1* | 9/2016 | Seo ....................... H04L 1/1861 |

* cited by examiner

METHOD AND APPARATUS FOR GENERATING CODE SEQUENCE IN A COMMUNICATION SYSTEM

CROSS-REFERENCE TO RELATED APPLICATIONS

This application is a Continuation of copending application Ser. No. 12/298,488, filed on May 11, 2009, which was filed as the National Phase of PCT/KR2007/002117 on Apr. 30, 2007, which claims the benefit under 35 U.S.C. § 119(a) to Patent Application Nos. 10-2006-0039338 filed in the Republic of Korea on May 1, 2006, 10-2006-0076146 filed in the Republic of Korea on Aug. 11, 2006 and 10-2006-0076813 filed in the Republic of Korea on Aug. 14, 2006 , all of which are hereby expressly incorporated by reference into the present application.

TECHNICAL FIELD

The present invention relates to a mobile communication system, and more particularly, to a method for generating a code sequence in a mobile communication system and a method and apparatus for processing data for transmission of the code sequence.

BACKGROUND ART

A pilot signal or preamble, which is used in a mobile communication system, means a reference signal used for acquisition of initial synchronization, cell detection, channel estimation, etc. An orthogonal or quasi-orthogonal code having good correlation properties may be used as a code sequence which constitutes the preamble.

For example, in case of PI (Portable Internet, Specifications for 2.3 GHz band Portable Internet Service-Physical Layer), 127 sequences excluding one of which components are all 1 are inserted in a frequency domain by using 128×128 Hadamard matrix.

A CAZAC (Constant Amplitude Zero Auto-Correlation) sequence is mainly characterized in that its amplitude is uniform and autocorrelation is represented by a delta function type. However, cross correlation of the CAZAC sequence, although not zero, has a small value. GCL CAZAC sequence and zadoff CAZAC sequence, which are mainly used as the CAZAC sequences, are very similar to each other and have different orientations in phase.

First, the GCL CAZAC sequence is given by the following Equations 1 and 2.

$$c(k; N, M) = \exp\left(-\frac{j\pi M k(k+1)}{N}\right) \text{ (in case where } N \text{ is an odd number)} \quad [\text{Equation 1}]$$

$$c(k; N, M) = \exp\left(-\frac{j\pi M k^2}{N}\right) \text{ (in case where } N \text{ is an even number)} \quad [\text{Equation 2}]$$

The Zadoff CAZAC sequence can be expressed by the following Equations 3 and 4.

$$c(k; N, M) = \exp\left(\frac{j\pi M k(k+1)}{N}\right) \text{ (in case where } N \text{ is an odd number)} \quad [\text{Equation 3}]$$

$$c(k; N, M) = \exp\left(\frac{j\pi M k^2}{N}\right) \text{ (in case where } N \text{ is an even number)} \quad [\text{Equation 4}]$$

In the Equations 1 to 4 , N is a length of the sequence, M is a natural number which is relatively prime to N among natural numbers less than N, and k represents 0, 1, . . . , N.

Binary Hadamard codes or poly-phase CAZAC codes are orthogonal codes, and the number of the binary Hadamard codes or the poly-phase CAZAC codes, which maintains orthogonality, is limited. The number of orthogonal codes having a length of N, which can be obtained by N×N Hadamard matrix, is N, and the number of orthogonal codes having a length of N, which can be obtained by CAZAC code is equivalent to the number of natural numbers less than N, wherein the natural numbers are relatively prime to N. [David C. Chu, "Polyphase Codes with Good Periodic Correlation Propertie", *Information Theory IEEE Transaction on*, vol. 18, issue 4 , pp. 531-532, July, 1972]

For example, the length of one OFDM (Orthogonal Frequency Division Multiplexing) symbol in an OFDM system generally has a length of exponentiation of 2 to expedite FFT (Fast Fourier Transform) and IFFT (Inverse Fast Fourier Transform). In this case, if the sequence is generated by the Hadamard code, sequence types equivalent to the total length may be generated. If the sequence is generated by the CAZAC code, sequence types equivalent to N/2 may be generated. For this reason, a problem occurs in that there is limitation in the number of the sequence types.

SUMMARY OF THE INVENTION

Accordingly, the present invention is directed to a method and apparatus for generating a code sequence that can be used for acquisition of initial synchronization, cell detection, channel estimation, etc. in a communication system and a method for processing data for transmission of the code sequence, which substantially obviate one or more problems due to limitations and disadvantages of the related art.

An object of the present invention is to provide a method and apparatus for extending a range of a code sequence that can be used in a communication system.

Another object of the present invention is to provide a method and apparatus for processing data to generate a code sequence that can enhance efficiency in acquisition of initial synchronization, cell detection, or channel estimation in a communication system.

For example, if a CAZAC sequence is generated, maximum (N−1) types of a code are available, wherein N is a length of the code. According, to increase the types of the code, it is preferable to increase the length of the code. However, the code is actually determined at a short length considering bandwidth efficiency of a mobile communication system. To transmit much information at the same code length, a method for generating various kinds of codes with the same length is needed. Particularly, a method which is robust to a multi-path widely occurring in a radio channel and can sufficiently use frequency diversity effect is needed.

One example of the present invention discloses a method for generating various kinds of code sequences by combining at least two different code sequences with each other to generate new code sequences. In other words, according to one feature of the present invention, at least two code sequences are combined with each other to generate one code sequence. The following Equation 5 illustrates one example that at least two code sequences are combined with each other to generate one code sequence.

$$d(k; \tau_1, \tau_2, \ldots, \tau_L, M_1, M_2, \ldots, M_L, N) = \sum_{i=1}^{L} \lambda_i c(k - \tau_i; M_i, N)$$ [Equation 5]

In the above Equation 5, $\lambda_i$ is a power control constant for the $i^{th}$ code sequence, $\tau_i$ is a delay component of each code sequence, and $M_i$ is a sequence key of the $i^{th}$ code sequence.

The at least two code sequences are combined with each other by adding up of respective corresponding elements of the at least two code sequences, so as to generate one code sequence. Alternatively, the at least two code sequences may serially be concatenated and combined with each other to generate one code sequence. Examples of a code to which technical features of the present invention can be applied include, but not limited to, a binary code, a Hadamard code, and a poly-phase CAZAC code.

In one aspect of the present invention, a method for generating a code sequence in a transmitting side of a mobile communication system includes combining at least two code sequences with each other, and converting a code sequence generated by the combining step into a time domain signal.

In another aspect of the present invention, a transmitting apparatus for generating a code sequence in a mobile communication system includes a sequence combiner combining at least two code sequences with each other, and a time domain signal conversion module converting a code sequence generated by the combiner into a time domain signal.

In still another aspect of the present invention, a method for processing data for transmission of code sequence from a transmitting side of a mobile communication system to its receiving side includes mapping a first code sequence to some subcarriers belonging to a whole band used in the mobile communication system, mapping a second code sequence to the other subcarriers belonging to the whole band, and converting the first and second code sequences mapped to the subcarriers into time domain signals.

In further still another aspect of the present invention, a method for processing data for transmission of code sequence from a transmitting side of a mobile communication system to its receiving side includes generating a new code sequence by serially concatenating at least two code sequences, mapping the generated code sequence to some subcarriers belonging to a whole band used in the mobile communication system, and converting the code sequence mapped to the subcarriers into a time domain signal.

In further still another aspect of the present invention, a method for processing data for transmission of code sequence from a transmitting side of a mobile communication system to its receiving side includes converting at least one code sequence into a time domain signal, generating at least two different code sequences by performing circular shift for the at least one code sequence converted into the time domain signal, and combining the at least two code sequences generated by the circular shift.

In further still another aspect of the present invention, a transmitting apparatus for generating a code sequence for transmission to a receiving side in a communication system includes an IFFT module converting at least one code sequence into a time domain signal, a circular shift module generating at least two different code sequences by performing circular shift for the at least one code sequence converted into the time domain signal, and a combiner combining the at least two code sequences generated by the circular shift.

DETAILED DESCRIPTION OF THE INVENTION

Hereinafter, structures, operations, and other features of the present invention will be understood readily by the preferred embodiments of the present invention, examples of which are illustrated in the accompanying drawings.

Figure 1:
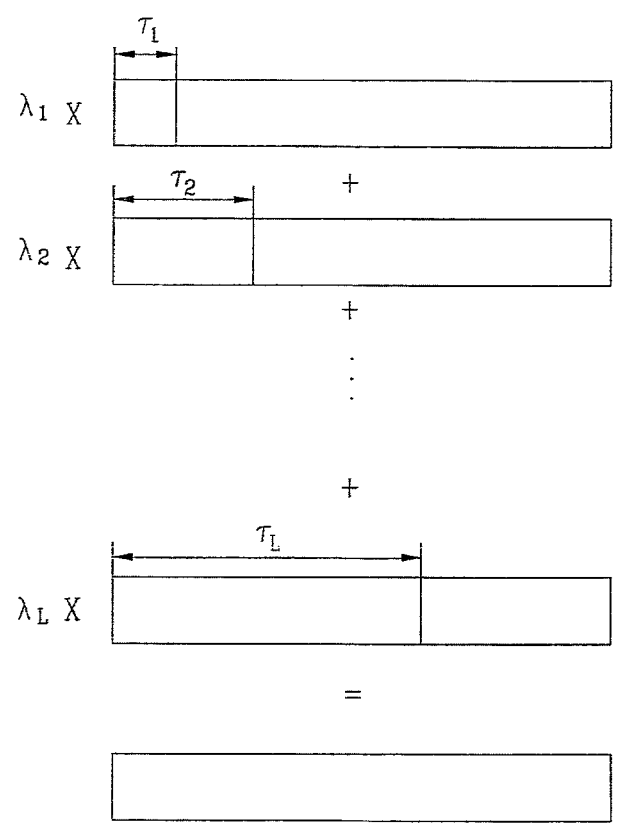
FIG. 1 is a view illustrating the preferred embodiment of the present invention.

FIG. 1 is a view illustrating the preferred embodiment of the present invention. Referring to FIG. 1, an $L^{th}$ CAZAC sequence is obtained in such a manner that an optional CAZAC sequence, for example, a sequence generated by any one of the Equations 1 to 4 is circular shifted by $\tau_L$. In this case, circular shift means that delay occurs in the CAZAC sequence to shift the order of elements. For example, when a code sequence consisting of five elements of A, B, C, D, E is circular shifted by $\tau_L=2$, a code sequence having the order of C, D, E, A, B is generated. Although the CAZAC sequence generated by circular shift has orthogonality with the original sequence before circular shift, a peak is generated by cross correlation.

The original CAZAC sequences before circular shift, which correspond to the first CAZAC sequence to the $L^{th}$ CAZAC sequence, may be the same sequences as one another or different sequences. In other words, after one CAZAC sequence is circular shifted to generate at least two different CAZAC sequences, the generated CAZAC sequences may be combined with each other to generate a new sequence. After each of at least two CAZAC sequences is circular shifted, the two CAZAC sequences may be combined with each other to generate a new sequence. If at least two different CAZAC sequences are combined with each other, they may not undergo circular shift. Combining at least two different CAZAC sequences means combining corresponding elements of the sequences.

Figure 2A:
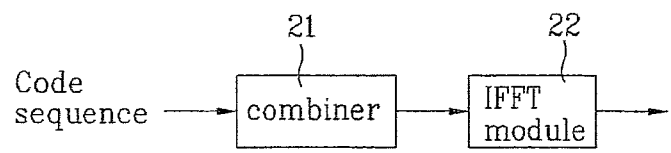
FIGS. 2A and 2B illustrate examples of hardware configuration for the present invention.

FIG. 2A is a block diagram illustrating a transmitting apparatus according to the preferred embodiment of the present invention. Referring to FIG. 2A, at least two different code sequences which have not undergone circular shift are combined with each other to generate a new code sequence. The transmitting apparatus of FIG. 2A includes a combiner 21 and an IFFT module 22. The combiner 21 receives at least two code sequences and combines respective elements of the code sequences with each other. The IFFT module 22 maps the code sequences generated by the combiner 21 to subcarriers, and performs IFFT to convert the mapped result into time domain signals. The combiner 21 may generate one code sequence by adding up corresponding elements of the at least two code sequences. Alternatively, the combiner 21 may generate one code sequence by serially concatenating the at least code sequences with each other. The at least two code sequences could be binary codes, Hadamard codes, or poly-phase CAZAC codes.

In the case that the at least two code sequences are serially concatenated with each other to generate one code sequence, combining step by means of the combiner 21 is omitted, any one of the code sequences is mapped to some subcarriers belonging to the whole band, and the other code sequence is mapped to the other subcarriers belonging to the whole band. Afterwards, IFFT is performed for the whole code sequences mapped to the subcarriers, whereby the same result can be obtained.

Figure 2B:
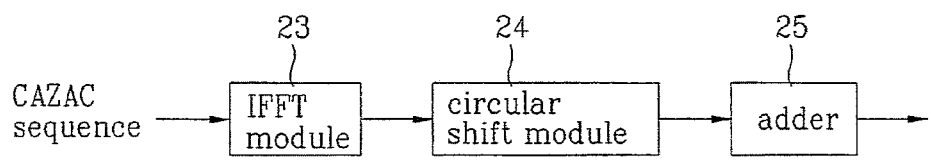

FIG. 2B is a block diagram illustrating another transmitting apparatus according to the preferred embodiment of the present invention.

Referring to FIG. 2B, at least two different CAZAC sequences which have undergone circular shift are combined with each other to generate a new CAZAC sequence. The transmitting apparatus of FIG. 2B includes an IFFT module 23, a circular shift module 24, and an adder 25. The IFFT module 23 receives at least one CAZAC sequence and converts the CAZAC sequence into a time domain signal. The circular shift module 24 circular shifts the at least one CAZAC sequence converted into the time domain signal to generate at least two different CAZAC sequences. The adder 25 adds the at least two different CAZAC sequences output from the circular shift module 24 to each other so as to generate a new CAZAC sequence.

Although the embodiment of FIG. 2B illustrates the example that the CAZAC sequences are circular shifted in a time domain, the CAZAC sequences may be circular shifted before IFFT, i.e., in a frequency domain to generate a plurality of CAZAC sequences. In this case, at least one CAZAC sequence is circular shifted before IFFT to generate at least two CAZAC sequences, and the generated CAZAC sequences are combined with each other to generate a new CAZAC sequence, whereby the generated new CAZAC sequence is converted into a time domain signal by IFFT.

In the Equation 5, $\lambda_i$ is a power control constant for the $i^{th}$ CAZAC sequence, and is to allow a new sequence generated by combination of at least two CAZAC sequences to perform normalization, thereby allowing each element to obtain amplitude of 1. Two methods for normalization can be considered. The first method is that each element of the generated sequences is divided by an absolute value of each element. The second method is that the overall power of the generated sequences is adapted to the number N of the elements.

Figure 3:
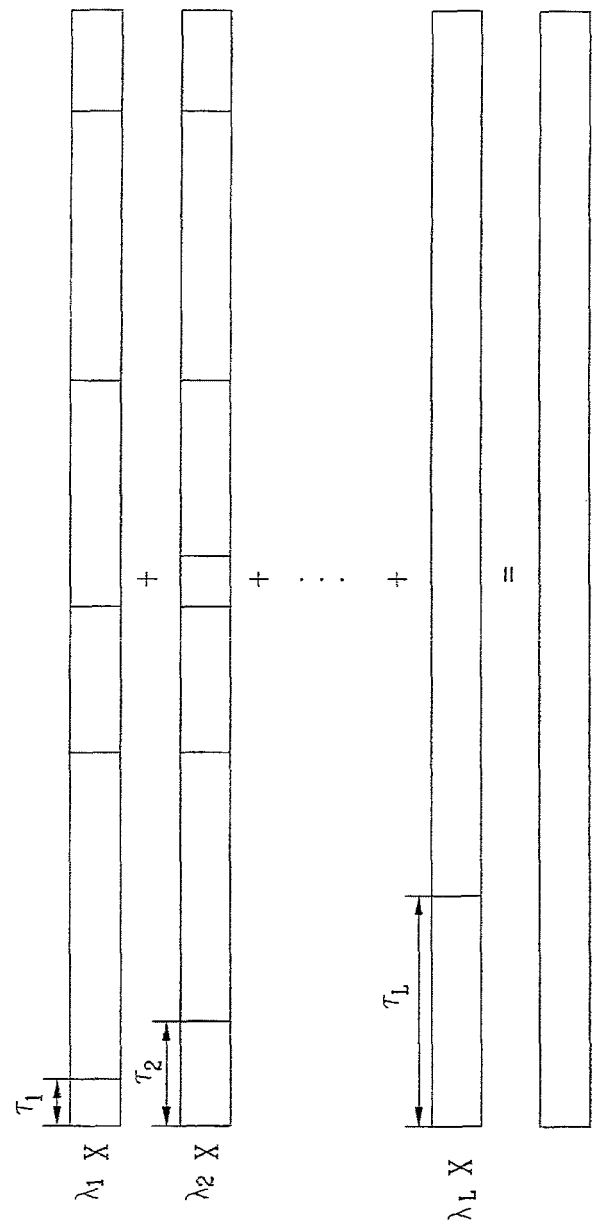
FIG. 3 is a view illustrating another preferred embodiment of the present invention.

FIG. 3 is a view illustrating another preferred embodiment of the present invention. Referring to FIG. 3, at least two code sequences are combined with each other to generate one code sequence. If the at least two code sequences combined with each other have different lengths, the respective code sequences are combined with each other in such a manner that their lengths are adapted to the that of the longest code sequence to allow the other code sequences except the longest code sequence to have repeated patterns. Examples of a method for combining at least two code sequences with each other include a method for adding up corresponding elements and a method for serially concatenating code sequences having different patterns. The method for adding up corresponding elements of at least two code sequences to generate one code sequence can be expressed by the following Equation 6.

$$d(k; \tau_1, \tau_2, \ldots, \tau_L, M_1, M_2, \ldots, M_L, N_1, N_2, \ldots, N_L) = \sum_{i=1}^{L} \lambda_i c(k - \tau_i; M_i, N_i)$$ [Equation 6]

According to combination which represents the code generated as expressed by the Equation 5 or 6, and $(\tau_1, \tau_2, \ldots, \tau_L, M_1, M_2, \ldots, M_L)$ and code types having diversity of $N^{2L}$ are generated. In this case, although the present invention is intended to sufficiently increase codes, if many codes are combined with one another, a receiving side may suffer difficulty in finding each code due to cross correlation. Particularly, if delay occurs due to circular shift, a method for stably estimating such delay is needed. To this end, supposing that $\tau_1=0$ is obtained, relative position for delay of each sequence can be identified. Accordingly, the method can be used even in case that a start position of the code is unclear. In order that combination of keys in delay and code which are detected can be mapped with a coordinate value of 2L dimension one to one, the relative position of delay, i.e., a coordinate position of the code key should be identified to enable such 1:1 mapping. To this end, a limited condition is preferably required for delay of each code sequence as expressed by the following Equation 7.

$$\tau_i \leq \tau_j, \ i<j$$ [Equation 7]

According to the condition of the Equation 7, although the number of codes that can be generated is decreased to reach less than $N^{2L}$, the order of $N^{2L}$ is maintained.

Accordingly, a coordinate value mapped with the code one to one can be identified, wherein the code is generated by adding at least two code sequences to each other. From the identified coordinate value, various kinds of information can be transferred or signal can be identified.

Figure 4:
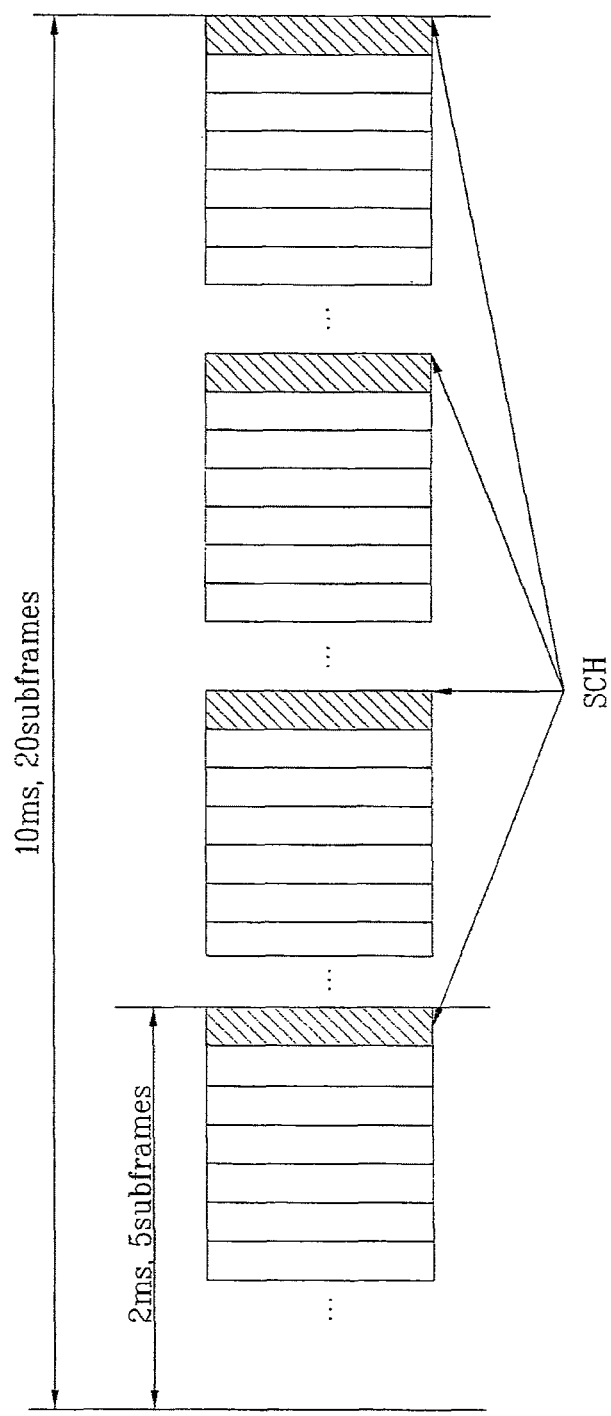
FIG. 4 is a view illustrating another preferred embodiment of the present invention.

FIG. 4 is a view illustrating another preferred embodiment of the present invention. Referring to FIG. 4, one sequence code generated by combination of at least two CAZAC sequences is applied to a synchronization channel (SCH). Although this one sequence code may equally be applied a random access channel (RACH), a code expression value may differently be interpreted.

The embodiment of FIG. 4 corresponds to the case of L=2 of the code combination of FIG. 1. In other words, an expression value of the code is $(\tau_1, \tau_2, M_1, M_2)$, wherein $\tau_1=0$ is obtained, and $M_1$ is set as a key value of a code that will be used in common. In other words, two degrees of freedom are decreased from the above limitation, so that the code expression value may be expressed simply by $(\tau_2, M_2)$. This means that the amount of the codes increases through a delay value of the second code and a key value of the code. Supposing that every sample delay can occur, $(N-1)\times(N-1)$ code combinations which are a total number of available cases are generated.

In FIG. 4, it is supposed that four synchronization channels (SCH) exist in an interval of 20 ms and the same code is transmitted to each channel. The synchronization channels (SCH) are used for acquisition of time synchronization from a receiving signal of a receiving side, acquisition of overall frame synchronization after time synchronization, and acquisition of cell identifier (cell ID) or cell group ID and other secondary information. This will now be described briefly.

1) Time synchronization: various methods can be used for time synchronization. For example, a method for transmitting a code to the SCH may be used. According to this method, a transmitting side transmits a code symbol to all the subcarriers while a receiving side obtains direct cross correlation between transmitting and receiving signals. Alternatively, if the transmitting side does not transmit the code symbol to all the subcarriers but transmit the code symbol at an interval of two subcarriers or greater, the signals represent periodicity in a time domain. Accordingly, based on this feature, a method for processing auto correlation of a receiving signal at a receiving side and searching for a peak may be used.

Of the above two methods, the method for transmitting a symbol to all the subcarriers has better performance. If the code sequence according to the present invention is transmitted, it can be applied to the above two cases. If the cross correlation method is used, a common code $M_1$ is used to obtain a correlation value. Since $M_1$ and other sequence added to $M_1$ are separate codes from each other, they are distinguishable from each other. If it is difficult to search for the sequences using one SCH, the SCHs within different superframes (interval of 20 ms) can be added to adapt synchronization.

2) Frame synchronization: since it is necessary to identify in what position each SCH exists, if SCHs are arranged at constant intervals, they are distinguishable through position information of the sequences included in each SCH or in such a manner that secondary-SCH (S-SCH) is additionally arranged next to the SCHs. If the code sequence according to the present invention is used, the position of each SCH can be identified by delay. In case of the RACH, other information which an access terminal desires can be transmitted along with the RACH.

3) Detection of Cell ID: detection of Cell ID should be obtained from SCH signals. Since information of the code $M_1$ has been identified during time synchronization, $M_1$ is removed from the receiving signal, and other signals can be identified easily by using phase differential incremental difference between successive code samples of the CAZAC sequence. In case of the RACH, various kinds of control information can be transmitted along with the RACH.

Figure 5:
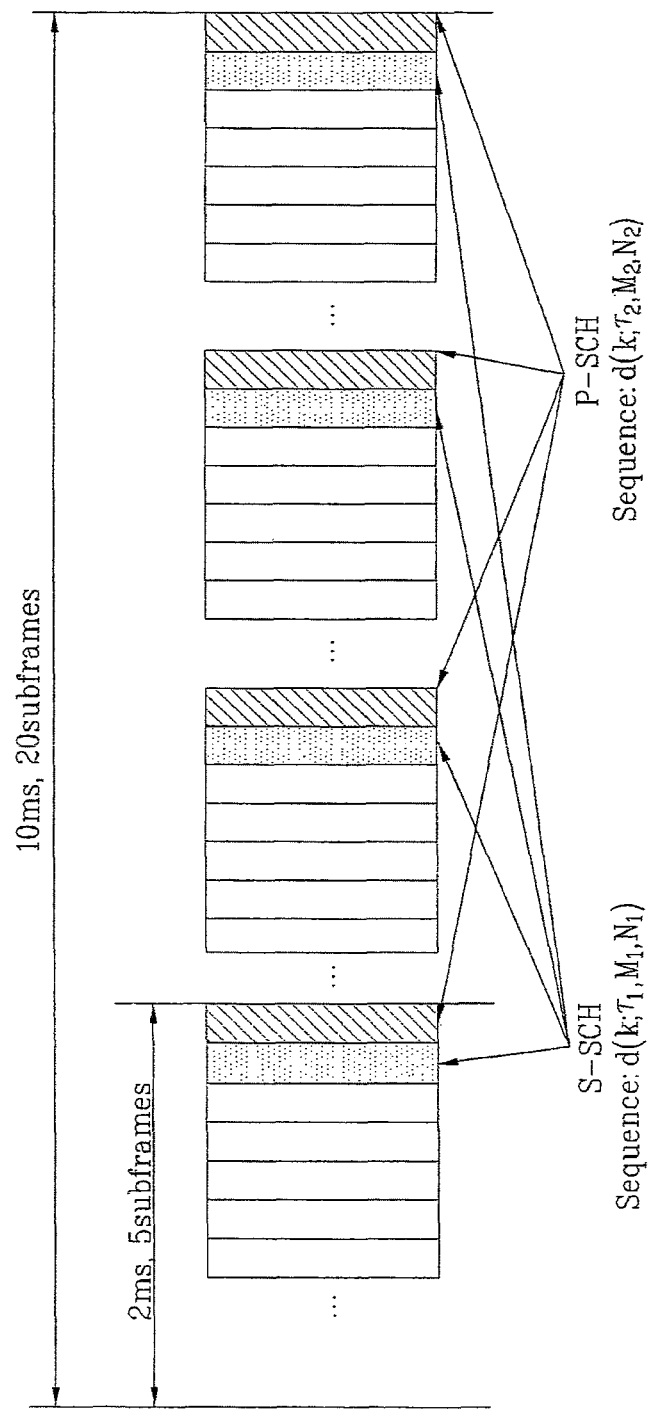
FIG. 5 is a view illustrating another preferred embodiment of the present invention.

FIG. 5 is a view illustrating another preferred embodiment of the present invention. The embodiment described with reference to FIG. 5 is applied to the case where a channel structure is a hierarchical structure. Referring to FIG. 5, a subframe of 2 ms hierarchically includes two synchronization channels, i.e., a primary synchronization channel (P-SCH) and a secondary synchronization channel (S-SCH).

In FIG. 5, the primary synchronization channel (P-SCH) exists to search for time synchronization of a symbol, and the same code sequence can be used in every cell. Although a value greater than 1 can be used as a value of L, the case L=1 is shown in FIG. 5. A code sequence for transmission of cell information for cell detection at the receiving side is used for the secondary synchronization channel (S-SCH). At this time, the code generated in accordance with the preferred embodiment of the present invention can be used. Preferably, many kinds of codes can be used in the secondary synchronization channel (S-SCH) if possible. In this case, the value of L may be greater than 1. In case of L=1, one code key (value of M) is associated with the cell, and much more kinds of information can be transferred depending on the delay value. If the value of L is greater than 1, information corresponding to L times of the case where the value of L is equal to 1 can be transferred.

Figure 6:
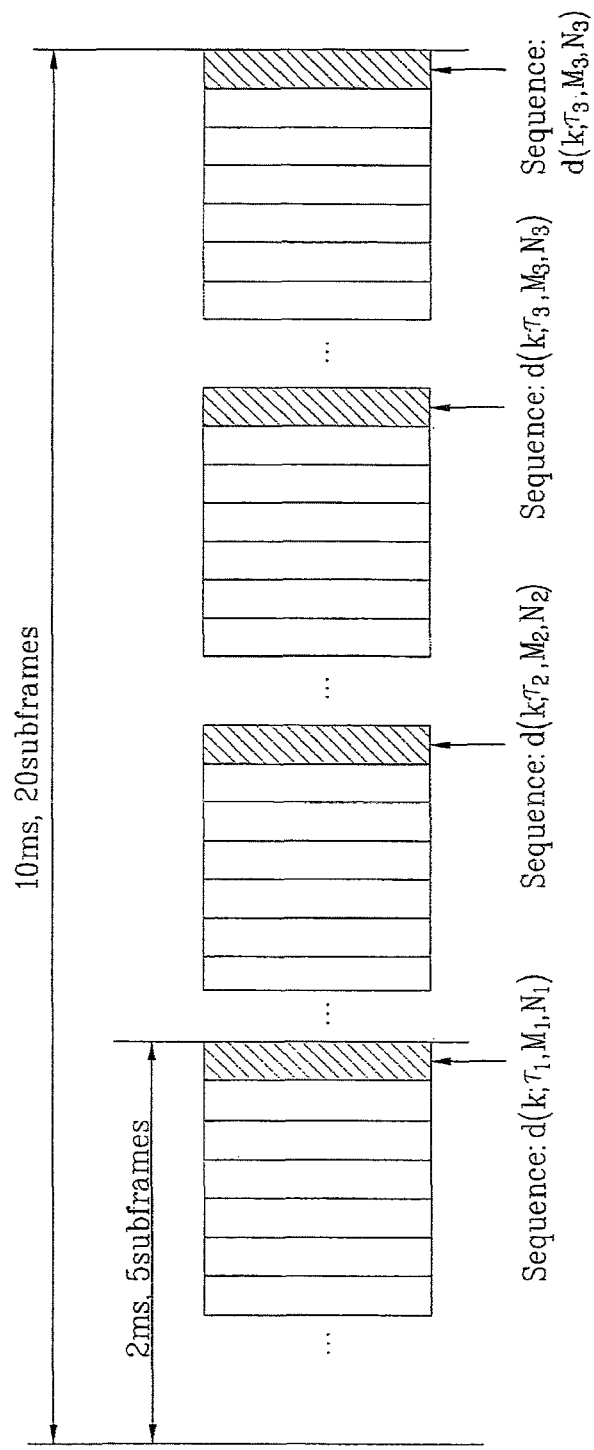
FIG. 6 is a view illustrating another preferred embodiment of the present invention.

FIG. 6 is a view illustrating another preferred embodiment of the present invention. The embodiment described with reference to FIG. 6 is applied to the case where a channel structure is a non-hierarchical structure.

The code according to the preferred embodiment of the present invention can be applied to each of synchronization symbols, and 1 or a value greater than 1 can be applied to the value of L. Furthermore, application of the code sequence generated by the Equation 6 enables that the code can be embedded over several synchronization channels, wherein combination of a long code sequence and a short code sequence may depend on the value of L. Referring to FIG. 6, when synchronization codes are inserted into the synchronization channels, four synchronization symbols may have different delays for the same code sequence or the same delay for different code sequence. Alternatively, synchronization symbols may be grouped (the size of the group is greater than 1), so that each group may have the same sequence. Accordingly, information provided by the synchronization channels is represented by combination of the key value M of the code and the delay value, and is characterized in that the information amount becomes L times if L increases.

As another preferred embodiment of the present invention, cell detection sequence employing the present invention will be described. The embodiment described hereinafter illustrates that technical features of the present invention are applied to a hierarchical structure and a non-hierarchical structure, which are discussed as structures of the synchronization channels in 3GPP LTE (Long Term Evolution). Furthermore, although the embodiment based on the GCL CAZAC code will be described hereinafter, since the Zadoff-Chu CAZAC sequence is different from the GCL code in symbol component of phase, its application will be the same as that of the GCL code. Likewise, application of other based CAZAC sequence will be the same as that of the GLC code.

Furthermore, the embodiment described hereinafter corresponds to the case L=1 and will be applied to the OFDM system. Accordingly, the embodiment described hereinafter will be based on circular shift after the GCL CAZAC code is generated and then undergoes IFFT. In this regard, the embodiment does not follow the expression method of the above equation but employs another notation.

First of all, an example of cell ID detection or cell group ID detection through the S-SCH in the hierarchical structure will be described. The SCH in the hierarchical structure includes P-SCH and S-SCH. The P-SCH is a channel where all the cells transmit the same signal, through which initial synchronization can be acquired. The S-SCH transmits information of cell-specific ID or cell group ID for each cell and also transmits secondary information required for acquisition of frame synchronization and other information. The secondary information required for acquisition of frame synchronization and the other information may be transmitted through a broadcast channel (BCH). Examples of a multiplexing method of the P-SCH and the S-SCH include TDM (Time Division Multiplexing), FDM (Frequency Division Multiplexing), and CDM (Code Division Multiplexing) depending on time, frequency, and code domains. The hierarchical structure shown in FIG. 5 corresponds to the case where multiplexing of the P-SCH and the S-SCH is TDM. Hereinafter, an example of TDM will be described for convenience.

The P-SCH can be provided by insertion of the GCL CAZAC code or another optional code. In this case, the same code for each cell is used. Accordingly, when the code generated by the preferred embodiment of the present invention is applied to the hierarchical structure, it is preferably used for the S-SCH which transmits cell-specific information.

The code for the S-SCH selects different values of M for each cell and transmits the selected values. In this case, types of codes that can be identified for each cell are related to the length N of the code, and the number of the codes is the number of natural numbers, which are relatively prime to N among natural numbers less than N. For example, in the 3GPP LTE system, since the number of subcarriers that can be used for synchronization channels of 1.25 MHz is 75, the number of codes that can be generated by the Equation 1 is 40 (M=1,2,4,7,8,11,13,14,16,17,19,22,23,26,28,29,31,32, 34,37,38,41,43,44,46,47,49,52,53,56,58,59, 61,62,64,67,68, 71,73,74) to generate codes with the length of N=75. Accordingly, the number of a total of cells that can be identified is 40. To increase the number of code sequences being generated with the same length, the following method may be considered. In other words, if the CAZAC sequence is generated for the case of N=79, a total of 78 code sequences are generated. At this time, if four elements are truncated from each code sequence to adjust the length of the code sequences to N=75, a total of 78 code sequences of N=75 can be generated.

Secondary information by circular shift sequence according to the preferred embodiment of the present invention can be used as information of cell ID classification, information of cell group ID classification, information of bandwidth of cell being transmitted, frame synchronization information, information of the number of transmitting antennas, bandwidth information of another channel such as BCH, and information of cyclic prefix (CP) length.

For example, if the CAZAC sequence is generated for the case of N=79 as above, a total of 78 code sequences are generated. At this time, if each code sequence is truncated to adjust the length of the code sequences to N=75 and the number of delay components by means of circular shift for each code sequence is 8, a total of 624(78×8) circular shift sequences can be obtained. In this case, supposing that 8 circular shift sequences are used for the P-SCH in the hierarchical structure, 616 circular shift sequences can be used for the S-SCH. If the circular shift sequences are used for cell ID classification or cell group ID classification, a total of 616 cells or cell groups can be identified.

If the code sequences according to the preferred embodiment of the present invention are used for cell classification, two cases can be considered as follows. In the first case, delay components according to circular shift are used as cell group ID information, and each code sequence is used as cell ID information. In the second case, each code sequence is used as cell group ID information, and delay components according to circular shift are used as cell ID information.

In the first case, since 8 delay components according to circular shift were supposed, 8 cell groups can be identified. Since the number of the code sequences is 78, 78 cells for each group can be identified. This will now be described in more detail.

Cell group ID=0 (delay group 0)
Code sequence index: 1, 2, 3, . . . , 78 (a total of 78 types)
Cell group ID=1 (delay group 1)
Code sequence index: 1, 2, 3, . . . , 78 (a total of 78 types)
Cell group ID=2 (delay group 2)
Code sequence index: 1, 2, 3, . . . , 78 (a total of 78 types)
Cell group ID=3 (delay group 3)
Code sequence index: 1, 2, 3, . . . , 78 (a total of 78 types)
Cell group ID=4 (delay group 4)
Code sequence index: 1, 2, 3, . . . , 78 (a total of 78 types)
Cell group ID=5 (delay group 5)
Code sequence index: 1, 2, 3, . . . , 78 (a total of 78 types)
Cell group ID=6 (delay group 6)
Code sequence index: 1, 2, 3, . . . , 78 (a total of 78 types)
Cell group ID=7 (delay group 7)
Code sequence index: 1, 2, 3, . . . , 78 (a total of 78 types)
{the number of a total of cell IDs: 624 types}

In the second case, 78 cell groups corresponding to the number of the code sequences can be identified, and 8 cells for each group can be identified. In both the first and second cases, a total of 624 (78×8) cells can be identified. Since one code sequence should be used for the P-SCH in the hierarchical structure, a total of 616 (77×8) cells can be identified.

To facilitate cell planning during network design, a large number of cell IDs in a physical level are preferably required if possible. Also, although all cell IDs prescribed on the standard during network design may be used, some of them may be used. Accordingly, a network designer can use the required number of cell IDs for network design through grouping. For example, supposing that there are provided a total of 624 available cell IDs and that 234 cell IDs are only required during cell design, three cell group IDs having 78 cell IDs can be used.

As another example, supposing that the number of required cell IDs is 512, 64 code sequences are respectively used for 8 cell groups. This will now be described in more detail.

Cell group ID=0 (delay group 0)
Code sequence index: 1, 2, 3, . . . , 64 (a total of 64 types)
Cell group ID=1 (delay group 1)
Code sequence index: 1, 2, 3, . . . , 64 (a total of 64 types)
Cell group ID=2 (delay group 2)
Code sequence index: 1, 2, 3, . . . , 64 (a total of 64 types)
Cell group ID=3 (delay group 3)
Code sequence index: 1, 2, 3, . . . , 64 (a total of 64 types)
Cell group ID=4 (delay group 4)
Code sequence index: 1, 2, 3, . . . , 64 (a total of 64 types)
Cell group ID=5 (delay group 5)
Code sequence index: 1, 2, 3, . . . , 64 (a total of 64 types)
Cell group ID=6 (delay group 6)
Code sequence index: 1, 2, 3, . . . , 64 (a total of 64 types)
Cell group ID=7 (delay group 7)
Code sequence index: 1, 2, 3, . . . , 64 (a total of 64 types)
{the number of a total of cell IDs: 512 types}

Figure 7:
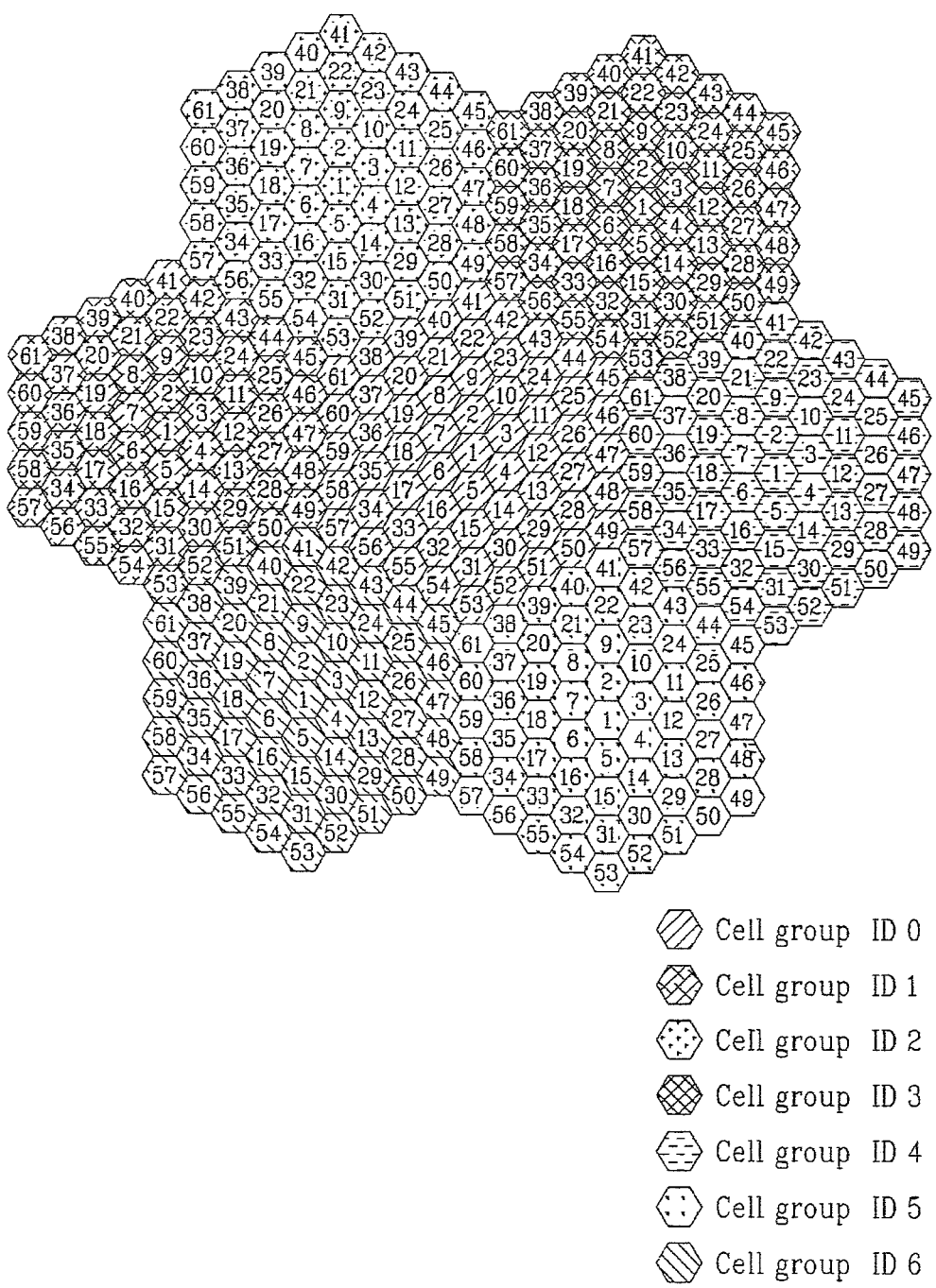
FIG. 7 is a view illustrating another preferred embodiment of the present invention.

FIG. 7 is a view illustrating another preferred embodiment of the present invention. In the embodiment of FIG. 7, when a total of 427 cell IDs are required during network design, the number of cell group IDs is 7 and the number of code sequences for each group is 61. In FIG. 7, numbers within cells represent examples of cell group IDs within each cell group. In FIG. 7, although one cell is comprised of one sector, it is apparent that one cell may be applied to other sector structure such as three sectors and six sectors.

As another example of delay components by means of circular shift according to the preferred embodiment of the present invention, the delay components by means of circular shift can be used to indicate information of the number of transmitting antennas or the length of CP. For example, the number (78) of the code sequences available by the existing sequences can be used for cell classification or cell group ID classification, and the number (8) of the delay components by means of circular shift can be used to indicate information of the case where the number of transmitting antennas is 4 and types of the CP length are 2.

Figure 8A:
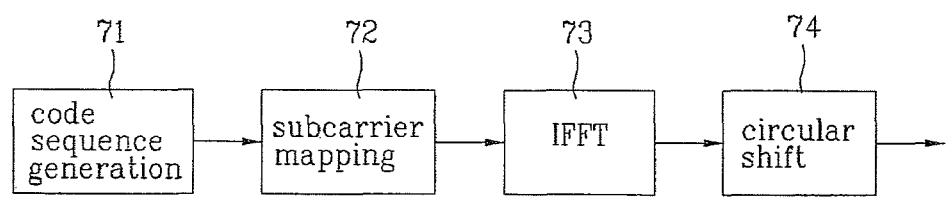
FIGS. 8A and 8B are views illustrating another preferred embodiment of the present invention.
Figure 8B:
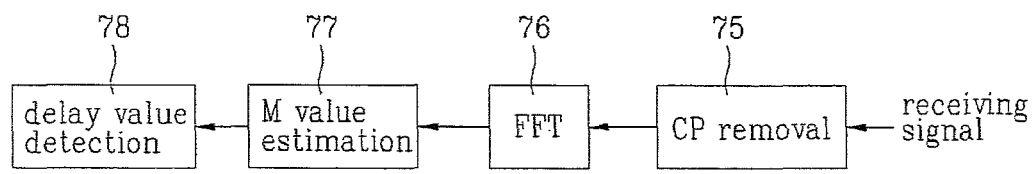

FIGS. 8A and 8B are views illustrating another preferred embodiment of the present invention. FIG. 8A is a flow chart illustrating the procedure of the transmitting side, and FIG. 8B is a flow chart illustrating the procedure of the receiving side.

Referring to FIG. 8A, the transmitting side generates the code sequences, i.e., GCL CAZAC codes (71). The transmitting side may not generate the code sequences directly but store previously generated code sequences so as to output them if necessary. The GCL CAZAC codes can be generated by the following Equation 8.

$$C^M(k) = \exp(-j\pi k(k+1)/N) \quad \text{[Equation 8]}$$

k=0,1, . . . , N−1

In the Equation 8, $C^M(k)$ is a GCL code of the kth element having a seed value of M. Since N which is a code length corresponds to N=75, the equation where N is an odd number has been used.

The transmitting side maps each subcarrier to the generated code sequences (72). In this step, the transmitting side can insert guard subcarrier and DC subcarrier in accordance with the following Equation 9.

$$C_{guard}^M = f(C^M) \quad \text{[Equation 9]}$$

In this Equation 9, f( ) is a function which maps a complex signal equivalent to used subcarrier to the guard subcarrier and the DC subcarrier for IFFT modulation.

The transmitting side performs IFFT for the code sequences mapped to the subcarriers in accordance with the following Equation 10 to generate OFDM symbols of the time domain.

$$c^M(n) = \frac{1}{N_{fft}} \sum_{k=0}^{N_{fft}-1} \left( C_{guard}^M(k) \exp\left( j\frac{2\pi k n}{N_{fft}} \right) \right) \quad \text{[Equation 10]}$$

$k = 0, 1, 2, \ldots, N_{fft} - 1$ $n = 0, 1, 2, \ldots, N_{fft} - 1$

The transmitting side performs circular shift for the IFFT performed signal in accordance with the following Equation 11.

$$c_\tau^M(n) = c^M(\mathrm{mod}(N_{fft}+n-\tau, N_{fft})) \quad \text{[Equation 11]}$$

In the Equation 11, mod(a,b) means the remainder obtained by dividing a by b. The Equation 11 means circular shift to the right. Circular shift to the left can be obtained by the following Equation 12.

$$c_\tau^M(n) = c^M(\mathrm{mod}(N_{fft}+n+\tau, N_{fft})) \quad \text{[Equation 12]}$$

In view of the frequency domain, the signal generated by the Equation 11 is converted into a form of a phase value of each subcarrier, which is linearly increased, as expressed by the following Equation 13.

$$C_r^M(k) = C_{guard}^M(k) \cdot \exp\left(-j\frac{2\pi k \tau}{N_{fft}}\right) \quad \text{[Equation 13]}$$

Although it has been described above that circular shift is performed in view of digital aspect, the signal after digital to analog (D/A) conversion may undergo circular delay. At this time, the number of samples which undergo circular shift is selected considering delay spread of a channel considered in a system which is used. Conventionally, since the CP length is designed considering such delay spread in an OFDM system, a CP interval range (exactness is not necessarily required) is considered when this step is performed.

Figure 9:
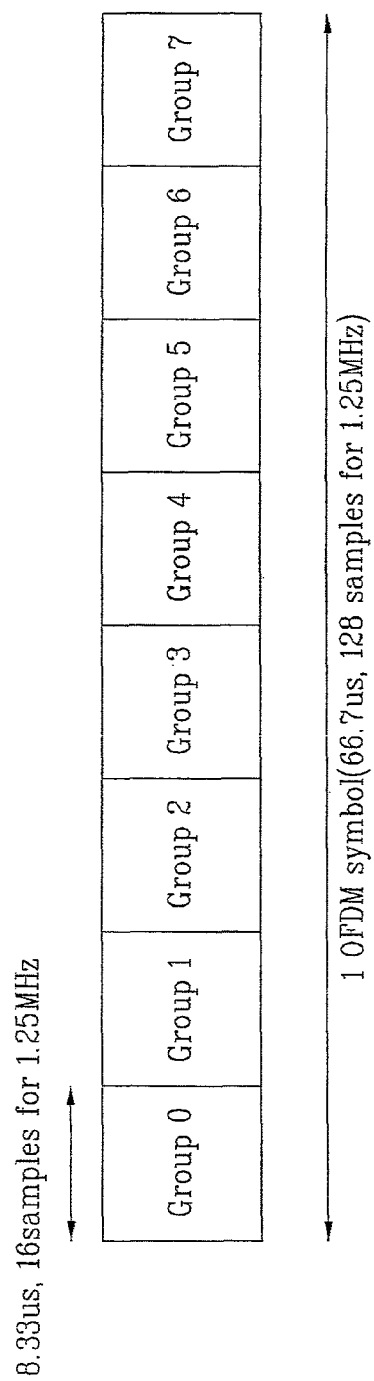
FIG. 9 is a view illustrating an example that values that can be used as delay components are set in accordance with the preferred embodiment of the present invention.

FIG. 9 is a view illustrating an example that values that can be used as delay components are set in accordance with the preferred embodiment of the present invention. In FIG. 9, 128-point IFFT is performed so that 8 groups for each of 16 samples are grouped if the number of samples of OFDM symbols except CP is 128. The reason why grouping is performed for delay is to allow the receiving side to be robust to influence of a channel and exactly receive a delay value when the receiving side detects the delay value. Currently, since the maximum delay spread length of a typical urban (TU) model which is a channel model considered by the LTE is 5 us (10 samples), 16 samples which correspond to 8.33 us cover the maximum delay spread length. Also, since the length of a short CP is 4.69 us, 5.21 us, defining 8.33 us as one group is adequate even in case that design is performed based on the length of the short CP. The receiving side can robustly estimate a delay value through a margin in spite of interference such as remaining symbol timing offset. The grouping method for grouping 8 groups for each of 16 samples with respect to the 128 symbols is only exemplary, and various numbers of groups and various numbers of samples for each group, such as 16 groups for each of 8 samples, may be defined.

Delay combination that can be obtained in this embodiment includes 8 types such as 0 us (0 sample), 8.330 us (16 samples), 16.66 us (32 samples), . . . , 58.3 lus (112 samples). Although it has been described that 128-point IFFT is performed, other-point (256, 512, 1024, 1536, 2048) IFFT may be performed if 1.25 MHz (75 subcarriers) is used for the SCH and the other band is used for other purpose in the same manner as the LTE. In either case, the time corresponding to one OFDM symbol length is uniformly maintained at 66.7 us even though the number of the samples depends on each case.

Hereinafter, a method for detecting a code at a receiving side in accordance with the preferred embodiment of the present invention will be described with reference to FIG. 8B.

Referring to FIG. 8B, the receiving side removes cyclic prefix (CP) of a received signal (75) and performs fast fourier transform (FFT) (76). The result is as expressed by the following Equation 14.

$$R(k) = C_r^M(k)H(k) + N(k) \quad \text{[Equation 14]}$$

$$= C_{guard}^M(k) \cdot \exp\left(-j\frac{2\pi k \tau}{N_{fft}}\right) H(k) + N(k)$$

$k = 0, 1, 2, \ldots, N_{fft} - 1$

The receiving side estimates the value of M of the GCL CAZAC code transmitted from the transmitting side by using the FFT result (77). The value of M can be estimated through the maximum value of IDFT value of differential encoding in accordance with the following Equation 15.

$$M' = \text{Index}\left(\max_n(IDFT(R(k-1)^*R(k)))\right) \quad \text{[Equation 15]}$$

In the Equation 15, when $(R(k-1))^* \times R(k)$ is performed, a delay component $\tau$ added intentionally by the transmitting side becomes a constant of $\exp(-j\tau)$ and thus does not affect estimation of the value of M. In the Equation 15, ( )* means conjugate.

It will be apparent that maximum values are only detected during detection and some of the maximum values are selected as candidate values so as to process the selected values in parallel.

The receiving side detects the delay component $\tau$ after estimating the value of M (78). The delay component can be estimated through the following steps.

In the first step, the received signal is compensated by the GCL CAZAC sequence corresponding to M' estimated by the Equation 15, and this step can be performed by the following Equation 16.

$$R'(k) = R(k) \cdot (C^M(k))^* \quad \text{[Equation 16]}$$

Once the first step is performed, frequency response of the channel in the frequency domain can be obtained.

In the second step, IFFT is performed for the resultant value of the Equation 16, and this step can be performed by the following Equation 17.

$$r'(n) = IFFT(R'(k)) \quad \text{[Equation 17]}$$

Once the second step is performed, impulse response in the time domain can be obtained.

Figure 10:
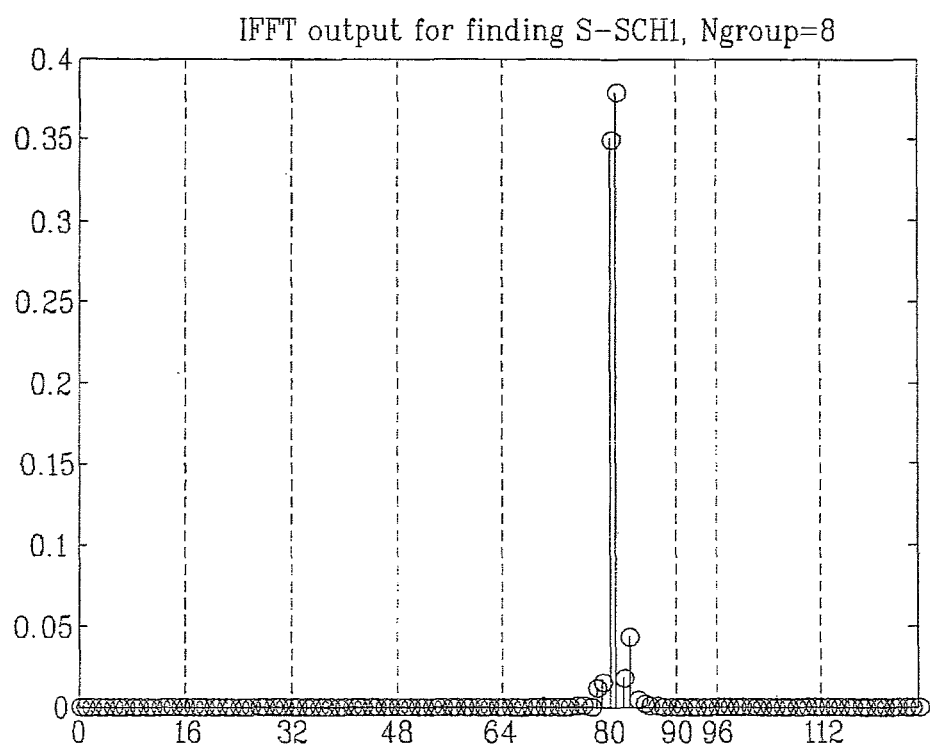
FIG. 10 is a view illustrating steps of the preferred embodiment of the present invention.

FIG. 10 is a view illustrating the resultant value after the second step is performed.

In the third step, powers within each of delay groups are added, and the group having the greatest value of the added values is selected. This step can be performed by the following Equation 18.

$$D' = \text{Indexofgroup}\left(\max_g \left(\sum_{l=0}^{N_{fft}/N_g - 1} \left|(r')^g\left(\frac{N_{fft}}{N_g} \cdot g + l\right)\right|^2\right)\right) \quad \text{[Equation 18]}$$

In the Equation 18, $N_g$ means the number of groups that can generate delay, and g means group indexes (0,1, ... ).

Figure 11:
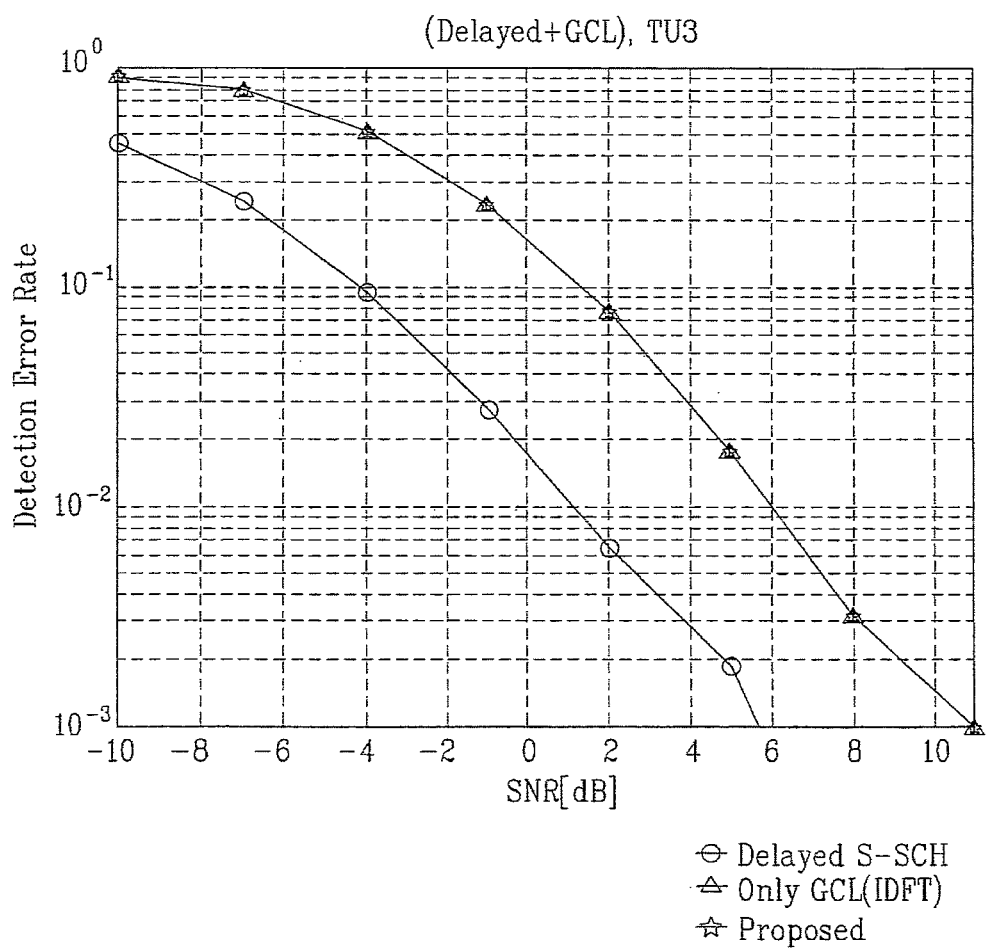
FIG. 11 illustrates a performance curve according to the preferred embodiment of the present invention.

FIG. 11 illustrates a performance curve according to the preferred embodiment of the present invention. Referring to FIG. 11, a detection error rate is shown under the experimental environment of the TU channel model of 3 km/h.

In FIG. 11, i) 'Delayed S-SCH' illustrates detection performance which detects the delay group only, ii) 'Only GCL(IDFT)' illustrates a performance graph when the GCL code according to the related art is only used, and iii) 'Proposed' illustrates a performance graph from the method according to the preferred embodiment of the present invention.

iii), which corresponds to the present invention, is obtained by combination of i) and ii). Since suggested overall performance depends on poorer performance of i) and ii), it depends on performance of ii). Accordingly, it is noted that overall performance is obtained almost equally to that obtained by the related art only.

It is noted that although the number of available cell IDs in case of N=75 is 40 in the related art, the number of cell IDs increases to 40×8=320 without degradation of performance in the preferred embodiment of the present invention.

In the case that two base stations use the same M and different delay values in accordance with the present invention, a user equipment detects two delay groups when two signals simultaneously reach the user equipment. To avoid this specific circumstance, a limitation that two base stations should use different values of M can be considered. In this case, although the number of cell IDs is equal to that of the related art (40), information (8 types) by means of delay can be used for other secondary information (ex., frame synchronization information).

In the hierarchical structure, initial synchronization is performed by the P-SCH, and cell ID is detected through the S-SCH. On the other hand, in the non-hierarchical structure, both initial synchronization and cell ID detection are performed through the SCH. Initial synchronization of the hierarchical structure is performed by cross correlation using a common signal which each user equipment knows as every base station transmits the common signal through the P-SCH. On the other hand, initial synchronization of the non-hierarchical structure is performed by blind detection using auto correlation through a repeated structure of OFDM signals transmitted from the SCH. Accordingly, since there is no need to know a specific signal, anything transmitted from the SCH can undergo synchronization. In this regard, in the non-hierarchical structure, cell ID information is transmitted along with the SCH. If the technical spirit according to the present invention is applied to the non-hierarchical structure, cell ID information is transmitted and received in the same method as that applied to the S-SCH in the hierarchical structure.

According to the present invention, the following advantages can be obtained.

First, it is possible to extend the range of the code sequences that can be used in the communication system.

Second, in case of the synchronization channels, secondary information that can be transmitted can be increased.

Third, it is possible to prevent codes from being decreased by multi-path.

Finally, frequency diversity effect can be obtained when the receiving side performs code estimation.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for transmitting a signal by a transmitting side device, the method comprising:
    generating, by a sequence generator in the transmitting side device, a sequence of a frequency domain with a Constant Amplitude Zero Auto-Correlation (CAZAC) property;
    mapping the sequence into subcarriers;
    performing an Inverse Fast Fourier transform (IFFT), by an IFFT processor in the transmitting side device, on the subcarriers to convert the mapped sequence into a time domain sequence;
    performing a cyclic shift, by a shifter in the transmitting side device, on the time domain sequence; and
    transmitting, by a transmitter in the transmitting side device, the cyclically shifted time domain sequence to a receiving side device, wherein signaling information is signaled through the cyclically shifted time domain sequence generated by the cyclic shift, wherein the signaling information includes a length of a cyclic prefix, and wherein the sequence is generated based on a Zadoff-Chu sequence.

2. A transmitting side device comprising:

a processor to map a sequence of a frequency domain with a Constant Amplitude Zero Auto-Correlation (CAZAC) property into subcarriers and perform an Inverse Fast Fourier Transform (IFFT) on the subcarriers to convert the mapped sequence into a time domain sequence, wherein a cyclic shift is performed on the time domain sequence; and a transmitter to transmit the cyclically shifted time domain sequence to a receiving side device, wherein signaling information is signaled through the cyclically shifted time domain sequence generated by the cyclic shift, wherein the signaling information includes a length of a cyclic prefix, and wherein the sequence is generated based on a Zadoff-Chu sequence.

* * * * *